No. 713,446. Patented Nov. 11, 1902.
T. X. JONES.
ENDLESS CARRIER.
(Application filed Sept. 26, 1901.)
(No Model.)
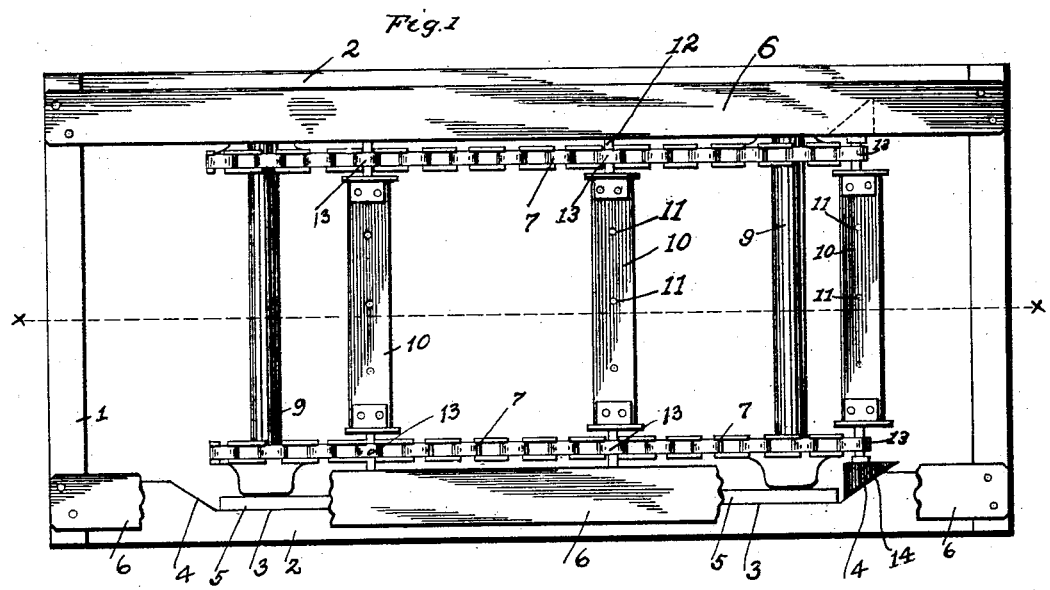
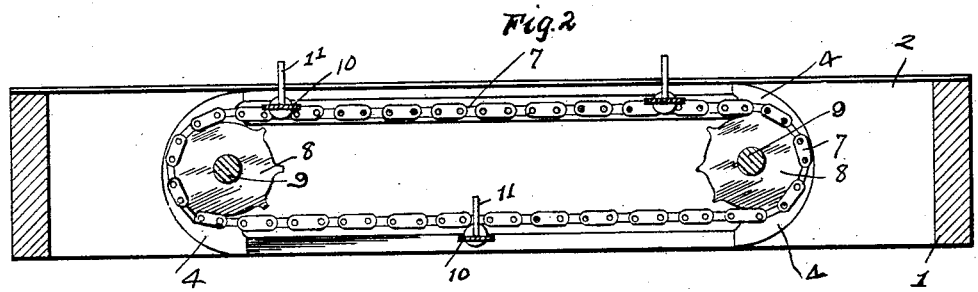
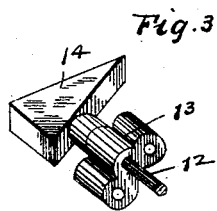
WITNESSES:
F. J. Zwerner.
A. L. Phelps
INVENTOR.
Thomas X. Jones
BY
C. A. Shepherd
ATTORNEY.

UNITED STATES PATENT OFFICE.

THOMAS X. JONES, OF COLUMBUS, OHIO, ASSIGNOR OF ONE-HALF TO WILLIAM T. LEWIS, OF COLUMBUS, OHIO.

ENDLESS CARRIER.

SPECIFICATION forming part of Letters Patent No. 713,446, dated November 11, 1902.

Application filed September 26, 1901. Serial No. 76,617. (No model.)

*To all whom it may concern:*

Be it known that I, THOMAS X. JONES, a citizen of the United States, residing at Columbus, in the county of Franklin and State of Ohio, have invented a certain new and useful Improvement in Endless Carriers, of which the following is a specification.

My invention relates to the improvement of endless carriers of that class which are adapted for use in harvesting and other machines where material is carried from one portion of the machine-frame to the other and in which toothed slats are carried by endless chains running over sprocket-wheels.

The objects of my invention are to provide improved and simple means whereby the teeth of toothed carrying arms or slats of endless chains are at all times caused to project upward and whereby any tendency toward carrying the grain or other material downward beneath the carrier is averted and the carrier-frame and carriers are permitted to be arranged in close proximity to the ground. These objects I accomplish in the manner illustrated in the accompanying drawings, in which—

Figure 1 is a plan view of a carrier-frame and carrier mounted therein, the same being provided with my improvement. Fig. 2 is a sectional view on line x x of Fig. 1, and Fig. 3 is a detail view in perspective of the end spindle of one of the toothed carrier bars or slats.

Similar numerals refer to similar parts throughout the several views.

In carrying out my invention I provide a suitable oblong carrier-frame 1, of which 2 represents the parallel side frame-bars. The inner face of each of these frame-bars is provided with a longitudinal recess, such as is indicated at 3, the end of each of these recesses terminating in an inclined shoulder 4, this shoulder being, as indicated more clearly in Fig. 2 of the drawings, curved or formed in the arc of a circle which extends from the top to the bottom of the side frame-piece. In the formation of the shoulders 4 the inclined faces thereof on opposite sides of the frame are parallel or arranged so that the outer termination of the shoulder 4 on one side of the frame is opposite the inner termination of the shoulder 4 on the opposite side. On the inner face of the recessed portion of each of the side frame-bars 2 I provide below and parallel with the upper surface of said frame-bar a longitudinal guide-bar 5, and upon the upper side of each of said frame-bars is also provided a longitudinally-arranged guide-plate 6, which extends inward over the guide-bar 5, resulting in the formation of guide-channels between the under sides of said plates 6 and the upper sides of said bars 5.

7 represents endless carrier-chains which are arranged on the inner side of each of the side frame-pieces 2 and which run over suitable sprocket-wheels 8, the latter being carried upon transverse shafts 9 or otherwise mounted to permit of their rotation. The parallel chains 7 are connected at intervals with the usual or desirable forms of transverse carrier-bars 10, the latter having upwardly-projecting teeth 11. Each end of each of the carrier-bars 10 is provided with an end spindle 12, the spindles of each bar being journaled in a suitable form of link-connecting block 13, these blocks being arranged at the proper intervals in said chains and being shown more clearly in Fig. 3 of the drawings. On the outer end of each of these spindles 12 is fixed a triangular head 14, these heads being adapted when the chain or that portion of the chain which carries said heads is running in a horizontal line to travel in the channels formed between the guide-bars 5 and guide-plates 6. It will be observed, however, that owing to the triangular form of the heads the inclined outer side thereof will as the bar-carrying portion of the chain passes over the sprocket-wheels run in the correspondingly-inclined shoulders 4 at the ends of the recesses 3 of the side frame-bars 2, with the result that through the close proximity of these inclined surfaces said head, together with the toothed bar with which it is connected, is prevented from turning in the passage of the chain over the sprocket-wheels. In this manner it will be observed that the bars 10 will be retained at all times during the traveling motion of the chains in such position as to cause the teeth 11 thereof to project upwardly. It is well known that in carriers of this class, where the bar becomes inverted by the downward movement of the chains over the sprocket-wheels, the teeth in turning to the downward positions have a tendency to carry therewith the straw, grain, or other material which is being conveyed by the carrier, whereas by the construction and operation described said teeth are retained in a vertical upwardly-projecting position at all times, and the material carried thereby is permitted a free discharge from the end of the carrier. It will also be seen that by the retention of the carrying-teeth in upwardly-projecting positions no room is required beneath the carriers or between the carriers and the ground for the passage of the teeth, thus permitting the carriers and frame to be arranged in close proximity to the ground or supporting-surface.

It will be understood that the bar-teeth shown herein are, in order to become effective as carrying devices, adapted to project through the longitudinally-slotted openings of the usual fixed platform, which is ordinarily arranged above the carrying mechanism herein shown. This slotted platform is well known, however, and is for the sake of clearness in illustration omitted from the construction shown.

Although no means are shown herein for imparting rotary motion to the sprocket-wheels, it is obvious that any well-known or desired means may be employed for this purpose.

Having now fully described my invention, what I claim, and desire to secure by Letters Patent, is—

In an endless carrier, the combination with a carrier-frame having its sides provided with recesses 3 terminating in inclined and curved shoulders 4, of sprocket-wheels journaled between said frame side bars, endless chains running over said sprocket-wheels, toothed bars 10 having end spindles journaled in said chains and a triangular head 14 rigidly connected with each of said spindles, substantially as specified.

THOMAS X. JONES.

In presence of—
C. C. SHEPHERD,
A. L. PHELPS.